(12) United States Patent
Lu et al.

(10) Patent No.: US 9,964,790 B2
(45) Date of Patent: May 8, 2018

(54) LIQUID CRYSTAL DISPLAY PANEL AND LIQUID CRYSTAL DISPLAY DEVICE

(71) Applicant: BOE TECHNOLOGY GROUP CO., LTD., Beijing (CN)

(72) Inventors: Jiaoming Lu, Beijing (CN); Teruaki Suzuki, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 90 days.

(21) Appl. No.: 14/437,073

(22) PCT Filed: Sep. 5, 2014

(86) PCT No.: PCT/CN2014/086028
§ 371 (c)(1),
(2) Date: Apr. 20, 2015

(87) PCT Pub. No.: WO2015/169016
PCT Pub. Date: Nov. 12, 2015

(65) Prior Publication Data
US 2016/0246129 A1     Aug. 25, 2016

(30) Foreign Application Priority Data
May 4, 2014   (CN) .......................... 2014 1 0184216

(51) Int. Cl.
*G02F 1/1333*   (2006.01)
*G02F 1/1335*   (2006.01)
*G02F 1/1343*   (2006.01)

(52) U.S. Cl.
CPC .. *G02F 1/133345* (2013.01); *G02F 1/133514* (2013.01); *G02F 1/134309* (2013.01);
(Continued)

(58) Field of Classification Search
CPC ................................................ G02F 1/134363
See application file for complete search history.

(56) References Cited

U.S. PATENT DOCUMENTS 5,558,927 A * 9/1996 Aruga ..................... G02B 5/201
                                                         359/589
5,897,187 A   4/1999 Aoki et al.
(Continued)

FOREIGN PATENT DOCUMENTS

CN          1991466 A      7/2007
CN        101387806 A      3/2009
(Continued)

OTHER PUBLICATIONS

First Office Action issued in corresponding Chinese Application No. 2014101842168 dated Jan. 29, 2015.
(Continued)

*Primary Examiner* — Edward Glick
*Assistant Examiner* — Shan Liu
(74) *Attorney, Agent, or Firm* — Brooks Kushman P.C.

(57) ABSTRACT

The present disclosure provides a liquid crystal display panel and a liquid crystal display device. The liquid crystal display panel includes a first substrate and a second substrate disposed opposite to the first substrate. The first substrate includes a first common electrode and a dielectric layer. The second substrate includes a second common electrode and a pixel electrode. The dielectric layer includes at least two dielectric sub-layers in a region corresponding to each pixel unit. Dielectric constants of the at least two dielectric sub-layer are different from each other.

16 Claims, 2 Drawing Sheets

(52) U.S. Cl.
CPC ............ *G02F 2001/134318* (2013.01); *G02F 2001/134345* (2013.01); *G02F 2201/07* (2013.01); *G02F 2201/121* (2013.01); *G02F 2201/122* (2013.01); *G02F 2201/124* (2013.01)

(56) References Cited

U.S. PATENT DOCUMENTS

| | | | | |
|---|---|---|---|---|
| 8,902,387 | B2* | 12/2014 | Suzuki | G02F 1/1337 349/130 |
| 9,097,937 | B2* | 8/2015 | Suzuki | G02F 1/1337 |
| 2001/0050742 | A1* | 12/2001 | Takeda | G02F 1/133707 349/138 |
| 2004/0066480 | A1* | 4/2004 | Yoshida | G02F 1/133707 349/123 |
| 2004/0263749 | A1 | 12/2004 | Jeong et al. | |
| 2006/0038953 | A1* | 2/2006 | Moriya | G02F 1/133514 349/144 |
| 2007/0146606 | A1 | 6/2007 | Yamashita | |
| 2008/0018844 | A1 | 1/2008 | Song | |
| 2008/0055526 | A1* | 3/2008 | Ino | G02F 1/133555 349/114 |
| 2009/0021660 | A1 | 1/2009 | Lu et al. | |
| 2009/0109356 | A1 | 4/2009 | Kitagawa | |
| 2010/0231832 | A1* | 9/2010 | Maezawa | G02F 1/133371 349/96 |
| 2011/0279762 | A1* | 11/2011 | Murata | G02F 1/134363 349/138 |
| 2012/0013594 | A1 | 1/2012 | Ishihara et al. | |
| 2012/0033114 | A1* | 2/2012 | Hung | G02F 1/136209 348/273 |
| 2012/0127417 | A1* | 5/2012 | Sakurai | G02F 1/134363 349/141 |
| 2012/0169981 | A1* | 7/2012 | Murata | G02F 1/134363 349/138 |
| 2012/0320288 | A1* | 12/2012 | Baek | G02B 3/14 349/5 |
| 2013/0002970 | A1* | 1/2013 | Baek | G02B 27/2214 349/5 |
| 2013/0057816 | A1* | 3/2013 | Hirosawa | G02F 1/1337 349/123 |
| 2014/0118651 | A1* | 5/2014 | Hirosawa | G02F 1/134309 349/43 |
| 2015/0338700 | A1* | 11/2015 | Kimura | G06F 3/0412 349/12 |

FOREIGN PATENT DOCUMENTS

| | | |
|---|---|---|
| CN | 101424852 A | 5/2009 |
| CN | 101487964 A | 7/2009 |
| CN | 101587257 | 11/2009 |
| CN | 102549489 | 7/2012 |
| CN | 102692770 | 9/2012 |
| CN | 102830568 | 12/2012 |
| CN | 102854693 | 1/2013 |
| CN | 103529606 | 1/2014 |
| CN | 103676297 | 3/2014 |
| CN | 103984141 | 8/2014 |
| JP | H11-231344 A | 8/1999 |
| JP | 2000-305100 A | 11/2000 |
| JP | 2001-159759 A | 6/2001 |
| JP | 2009-109657 A | 5/2009 |
| JP | 2010-015183 A | 1/2010 |
| JP | 2011-033821 A | 2/2011 |
| KR | 10-2004-0061447 A | 7/2004 |
| KR | 10-2004-0091184 A | 10/2004 |
| WO | 2010/137217 A1 | 12/2010 |
| WO | 2011/043103 A1 | 4/2011 |

OTHER PUBLICATIONS

International Search Report and Written Opinion issued in corresponding International Application No. PCT/CN2014/086028 dated Feb. 2, 2015.
Office Action in Chinese Patent Application No. 201110262823.8, dated Aug. 1, 2013.
Extended Search Report in European Patent Application No. 12787344.6, dated Apr. 7, 2015.
Office Action in European Patent Application No. 12787344.6, dated Dec. 4, 2015.
Office Action in Japanese Patent Application No. 2014-527487, dated May 20, 2016.
Office Action in Korean Patent Application No. 10-2012-7031056, dated Jan. 28, 2014.
Notice of Allowance in Korean Patent Application No. 10-2012-7031056, dated May 20, 2014.
International Search Report and Written Opinion in PCT International Application No. PCT/CN2012/081017, dated Nov. 22, 2012.
H. Yoshida et al., "23.1: Fast-Switching LCD with Multi-Domain Vertical Alignment Driven by an Oblique Electric Field," 2000 SID Digest, pp. 334-337.

* cited by examiner

LIQUID CRYSTAL DISPLAY PANEL AND LIQUID CRYSTAL DISPLAY DEVICE

CROSS-REFERENCE TO RELATED APPLICATIONS

The present application is the U.S. National Phase of International Patent Application No. PCT/CN2014/086028, filed on Sep. 5, 2014 which claims priority to Chinese Patent Application No. 201410184216.8 filed on May 4, 2014, the disclosures of which are incorporated in their entireties by reference herein.

TECHNICAL FIELD

The present disclosure relates to the field of display technology, in particular to a liquid crystal display panel and a liquid crystal display device.

BACKGROUND

A liquid crystal display is a flat panel display most widely used currently, which has features such as a low power consumption, a small size, a low weight and a low driving voltage.

Referring to FIG. 1, FIG. 1 is a schematic diagram showing a structure of electrodes and a liquid crystal layer in a liquid crystal display panel in the related art. The liquid crystal display panel includes a first common electrode 21 disposed at a side of a liquid crystal layer 30, a plurality of pixel electrodes 11 disposed at another side of the liquid crystal layer 30, and a plurality of second common electrodes 12 arranged alternately with the pixel electrodes. When no driving voltage is applied, liquid crystal molecules in the liquid crystal layer 30 are vertical; and when a driving voltage is applied, an electric field 40 is generated between the pixel electrodes 11 and the first common electrode 21 and the second common electrodes 12, the liquid crystal molecules are rotated under action of the electric field 40 so as to achieve a display. It can be seen from FIG. 1 that when the driving voltage is applied, the liquid crystal molecules at two sides of one pixel electrode 11 are arranged at two angles, which is referred to as a two-domain structure. In a display panel having a two-domain structure, a low contrast degree and a color shift exist. Especially in case of being at an oblique viewing angle, a quality of the display image observed by a user is poor.

Referring to FIG. 2, FIG. 2 is a schematic diagram showing another structure of electrodes and a liquid crystal layer in a liquid crystal display panel in the related art. Compared with the liquid crystal display panel in FIG. 1, in this liquid crystal display panel, a dielectric layer (OC) 22 is added on the side of the second common electrode 21. The dielectric layer 22 can make horizontal equipotential lines in the electric field 40 be distributed in the dielectric layer 22 as far as possible, which can increase a proportion of vertical equipotential lines in the liquid crystal layer 30, i.e., a proportion of the horizontal electric field, thereby increasing tilt angles of the liquid crystal molecules and improving the contrast degree of the liquid crystal display panel. Compared with the liquid crystal display panel in FIG. 1, although the liquid crystal display panel in FIG. 2 has a higher contrast degree, it is still a two-domain structure, and the problem also exists that in case of being at an oblique viewing angle, the viewing angle is not ideal. It is still difficult to solve this problem in the existing technology.

SUMMARY

In view of the above, the present disclosure provides a liquid crystal display panel and a liquid crystal display device, which can solve the problem that in case of being at an oblique viewing angle, the viewing angle is not ideal for the liquid crystal display panel in the related art.

To solve the above technical problem, one embodiment of the present disclosure provides a liquid crystal display panel, including a first substrate and a second substrate disposed opposite to the first substrate. The first substrate includes a first common electrode and a dielectric layer, the second substrate includes a second common electrode and a pixel electrode. The dielectric layer includes at least two dielectric sub-layers in a region corresponding to each pixel unit, dielectric constants of the at least two dielectric sub-layers are different from each other.

Alternatively, the pixel electrode and the second common electrode are disposed in a same layer, the pixel electrode includes a plurality of pixel sub-electrodes disposed in parallel, the second common electrode includes a plurality of common sub-electrodes disposed in parallel, the pixel sub-electrodes and the common sub-electrodes are arranged alternately.

Alternatively, the pixel electrode and the second common electrode are comb-shaped electrodes.

Alternatively, extension directions of the pixel sub-electrodes and extension directions of the common sub-electrodes are the same; a dividing line between every two adjacent dielectric sub-layers is parallel to the extension directions of the pixel sub-electrodes and the common sub-electrodes.

Alternatively, a width of each of the pixel sub-electrodes and the common sub-electrodes in a direction perpendicular to the extension direction is w, an interval between each pixel sub-electrode and an adjacent common sub-electrode is s, and a width of each dielectric sub-layer in the direction perpendicular to the extension direction is 2(w+s).

Alternatively, each pixel unit includes three sub-pixel units which are red, green, and blue.

Alternatively, the dielectric constant of the dielectric sub-layer corresponding to the red sub-pixel unit is set in such a manner that the dielectric sub-layer has a highest transmission rate for light with a wavelength of 620 nm to 760 nm; the dielectric constant of the dielectric sub-layer corresponding to the green sub-pixel unit is set in such a manner that the dielectric sub-layer has a highest transmission rate for light with a wavelength of 495 nm to 570 nm; the dielectric constant of the dielectric sub-layer corresponding to the blue sub-pixel unit is set in such a manner that the dielectric sub-layer has a highest transmission rate for light with a wavelength of 476 nm to 495 nm.

Alternatively, the dielectric constant of the dielectric sub-layer corresponding to the red sub-pixel unit is 2.5, the dielectric constant of the dielectric sub-layer corresponding to the green sub-pixel unit is 3.5, and the dielectric constant of the dielectric sub-layer corresponding to the blue sub-pixel unit is 4.5.

Alternatively, the dielectric layer includes at least two dielectric sub-layers in the region corresponding to each sub-pixel unit, dielectric constants of the at least two dielectric sub-layers are different from each other.

Alternatively, each of the sub-pixel units corresponds to one sub-pixel electrode; the sub-pixel electrodes and the second common electrode are disposed in a same layer; the sub-pixel electrode includes a plurality of sub-pixel sub-electrodes disposed in parallel; the second common electrode includes a plurality of common sub-electrodes disposed in parallel; the sub-pixel sub-electrodes and the common sub-electrodes are arranged alternately; extension directions of the sub-pixel sub-electrodes and extension directions of the common sub-electrodes are the same; in each sub-pixel unit, a dividing line between two adjacent dielectric sub-layers is parallel to the extension directions of the sub-pixel sub-electrodes and the common sub-electrodes; a width of each of the sub-pixel sub-electrodes and the common sub-electrodes in a direction perpendicular to the extension directions is w; an interval between each sub-pixel sub-electrode and an adjacent common sub-electrode is s; and a width of each dielectric sub-layer in the direction perpendicular to the extension directions is 2(w+s).

Alternatively, each of the pixel units includes sub-pixel units with more than four colors.

The present disclosure further provides a liquid crystal display device, including the above liquid crystal display panel.

The above technical solutions of the present disclosure at least have the following beneficial effects.

Since the dielectric constants of the at least two dielectric sub-layers corresponding to the region of each pixel unit are different, thus regions of the pixel unit corresponding to the at least two dielectric sub-layer have different electric fields. Therefore, the pixel region in the liquid crystal display panel may define one at least four-domain structure, that is, there are at least four directions of viewing angles, thus in case of being at oblique viewing angle, it is not prone to generate color shift.

DETAILED DESCRIPTION

To solve the problem that in case of being at an oblique viewing angle, the viewing angle is not ideal for the liquid crystal display panel in the related art, the present disclosure provides in one embodiment a liquid crystal display panel, including a first substrate and a second substrate disposed opposite to the first substrate. The first substrate includes a first common electrode and a dielectric layer. The second substrate includes a second common electrode and a pixel electrode. The dielectric layer includes at least two dielectric sub-layers at a region corresponding to each pixel unit. Dielectric constants of the at least two dielectric sub-layers are different from each other.

Since the dielectric constants of the at least two dielectric sub-layers corresponding to the region of each pixel unit are different, thus, the region of the pixel unit corresponding to the at least two dielectric sub-layers have different electric fields. Therefore, the pixel region in the liquid crystal display panel may define one at least four-domain structure, that is, there are at least four directions of viewing angles, thus in case of being at oblique viewing angle, it is not prone to generate color shift.

Alternatively, the pixel electrode and the second common electrode are disposed in a same layer. The pixel electrode includes a plurality of pixel sub-electrodes disposed in parallel. The second common electrode includes a plurality of common sub-electrodes disposed in parallel. The pixel sub-electrodes and the common sub-electrodes are arranged alternately.

The pixel electrode and the second common electrode may be comb-shaped electrodes.

Extension directions of the pixel sub-electrodes and extension directions of the common sub-electrodes are the same; a dividing line between every two adjacent dielectric sub-layers is parallel to the extension directions of the pixel sub-electrodes and the common sub-electrodes.

In order to make the technical problems to be solved, technical solutions and advantages of the present disclosure more clear, a detailed description will be given below in conjunction with the accompanying drawings and specific embodiments.

First Embodiment

Figure 1:
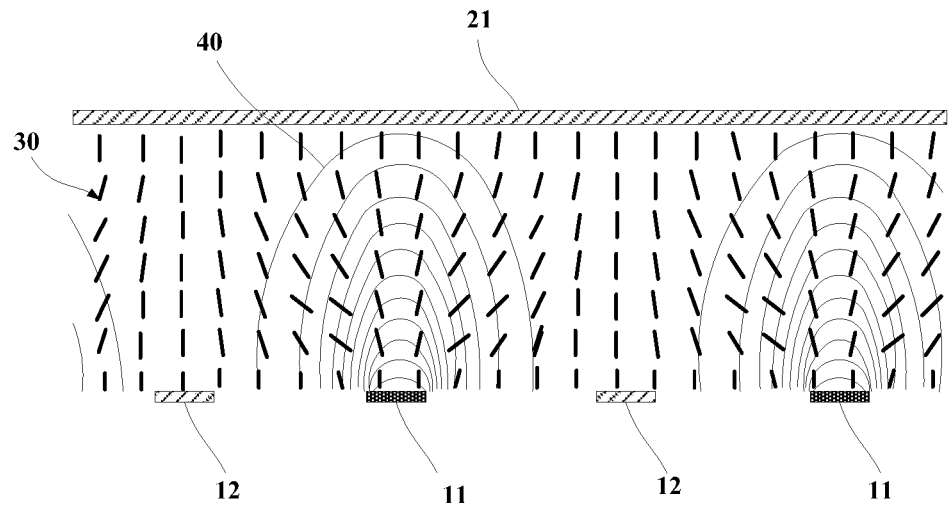
FIG. 1 is a schematic diagram showing a structure of electrodes and a liquid crystal layer in a liquid crystal display panel in the related art.
Figure 2:
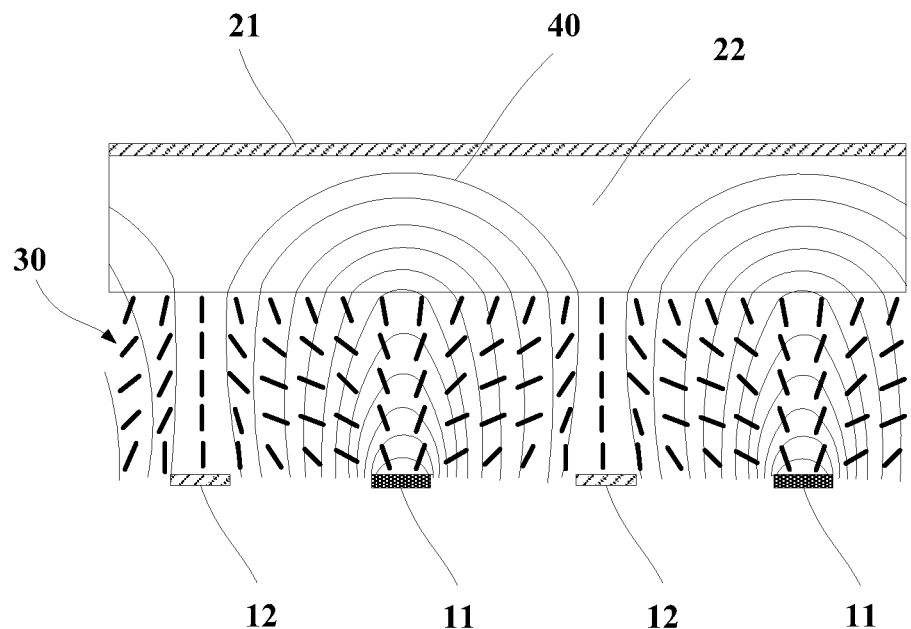
FIG. 2 is a schematic diagram showing another structure of electrodes and a liquid crystal layer in a liquid crystal display panel in the related art.
Figure 3:
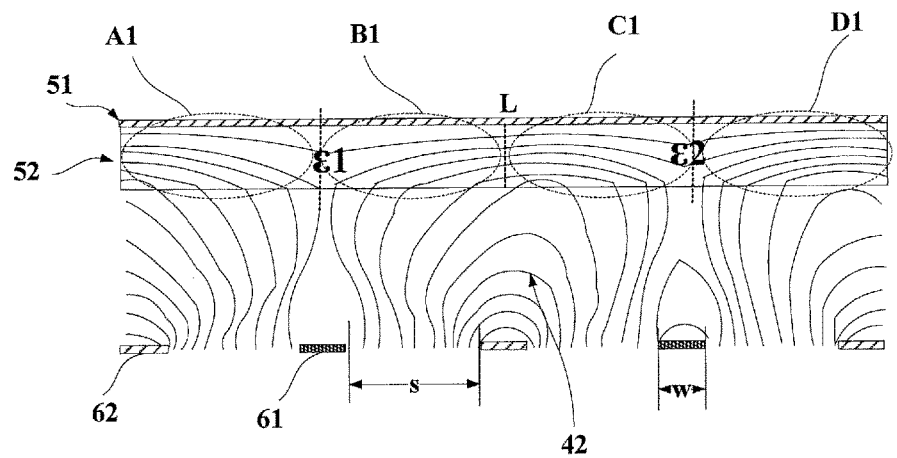
FIG. 3 is a schematic diagram showing a structure of a liquid crystal display panel according to a first embodiment of the present disclosure.

Referring to FIG. 3, FIG. 3 is a schematic diagram showing a structure of a liquid crystal display panel according to the first embodiment of the present disclosure.

In the embodiment of the present disclosure, the liquid crystal display panel includes a first substrate and a second substrate disposed opposite to the first substrate. A liquid crystal layer (not shown) may be provided between the first substrate and the second substrate. The first substrate includes a first common electrode 51 and a dielectric layer 52. The second substrate includes a plurality of pixel electrodes and second common electrodes. The pixel electrodes and the second common electrodes are disposed in a same layer. The pixel electrode includes a plurality of pixel sub-electrodes 61 disposed in parallel. The second common electrode includes a plurality of common sub-electrodes 62 disposed in parallel. The pixel sub-electrodes 61 and the common sub-electrodes 62 are arranged alternately. In other words, the pixel electrodes and the second common electrodes may be comb-shaped electrodes.

The dielectric layer 52 includes two dielectric sub-layers in a region corresponding to each pixel unit. A dotted line L shown in the figure is a dividing line between two dielectric sub-layers. Dielectric constants of the two dielectric sub-layers are different from each other. In one embodiment of the present disclosure, a dielectric constant of a first dielectric sub-layer is ∈1, and a dielectric constant of a second dielectric sub-layer is ∈2, where ∈1 and ∈2 are different.

Extension directions of the pixel sub-electrodes and extension directions of the common sub-electrodes are the same, and the dividing line between every two adjacent dielectric sub-layers is parallel to the extension directions of the pixel sub-electrodes and the common sub-electrodes.

A width of each pixel sub-electrode 61 and each common sub-electrode 62 in a direction perpendicular to the extension direction is w. An interval between each pixel sub-electrode 61 and its adjacent common sub-electrode 62 is s. A width of each dielectric sub-layer in the direction perpendicular to the extension direction is 2(w+s).

In the embodiment of the present disclosure, since a region A1 and a region B1 of the dielectric sub-layer with a dielectric constant of ∈1 have different electric fields, thus the liquid crystal molecules at two sides of the pixel electrode 61 corresponding to the dielectric sub-layer with the dielectric constant of ∈1 have two deflecting directions.

Since a region C1 and a region D1 of the dielectric sub-layer with a dielectric constant of ∈2 have different electric fields, thus the liquid crystal molecules at two sides of the pixel electrode 61 corresponding to the dielectric sub-layer with the dielectric constant of ∈2 have two deflecting directions.

In addition, since the interval between the region A1 and the region C1 is 2*(w+s), which is equal to the interval 2*(w+s) between different dielectric sub-layers, thus, intensities and directions of the electric fields in the region A1 and the region C1 are different. Similarly, intensities and directions of the electric fields in the region B1 and the region D1 are also different. As a result, the liquid crystal molecules have four deflecting directions and a four-domain structure may be defined in the pixel region of the liquid crystal display panel.

Since the pixel region of the liquid crystal display panel may define the four-domain structure, that is, there are four directions of viewing angles, thus, in case of being at oblique viewing angle, it is not prone to generate color shift.

Furthermore, a dielectric layer with a low dielectric constant may be introduced to reduce the driving voltage of the first common electrode.

In this embodiment, the dielectric layer 52 includes two dielectric sub-layers in the region corresponding to each pixel unit. Of course, in other embodiment, the dielectric layer 52 may further include more dielectric sub-layers in the region corresponding to each pixel unit to enable the pixel region in the liquid crystal display panel to define multi-domain structure.

Second Embodiment

Figure 4:
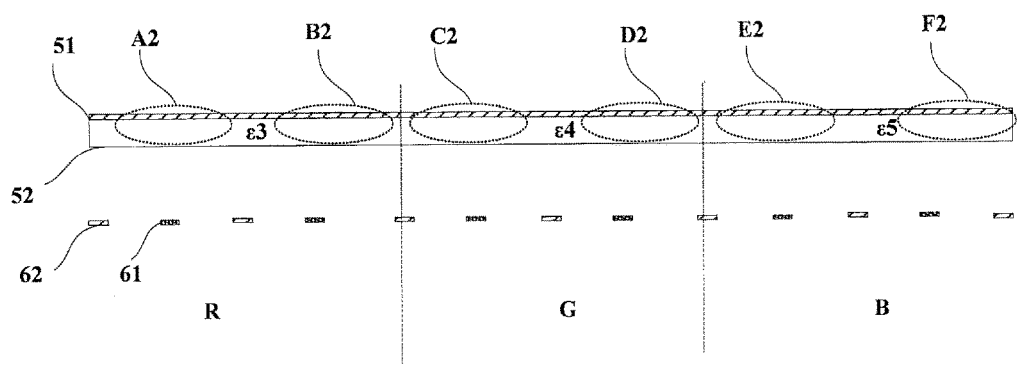
FIG. 4 is a schematic diagram showing a structure of a liquid crystal display panel according to a second embodiment of the present disclosure.

Referring to FIG. 4, FIG. 4 is a schematic diagram showing a structure of a liquid crystal display panel according to the second embodiment of the present disclosure.

In this embodiment, the liquid crystal display panel includes a first substrate and a second substrate disposed opposite to the first substrate. A liquid crystal layer (not shown) may be provided between the first substrate and the second substrate. The first substrate includes a first common electrode 51, a dielectric layer 52 and a plurality of pixel units (not shown). Each of the pixel units includes three sub-pixel units including a red (R) sub-pixel unit, a green (G) sub-pixel unit, and a blue (B) sub-pixel unit. In the figure, R, G, and B represent a region corresponding to a red sub-pixel unit, a region corresponding to a green sub-pixel unit and a region corresponding to a blue sub-pixel unit, respectively. The second substrate includes pixel electrodes and second common electrodes. The pixel electrode and the second common electrode are disposed in a same layer. The pixel electrode includes a plurality of pixel sub-electrodes 61 disposed in parallel, and the second common electrode includes a plurality of common sub-electrodes 62 disposed in parallel. The pixel sub-electrodes 61 and the common sub-electrodes 62 are arranged alternately. That is, the pixel electrodes and the second common electrodes may be comb-shaped electrodes.

The dielectric layer 52 includes three dielectric sub-layers in a region corresponding to each pixel unit. Dielectric constants of the respective dielectric sub-layers are different from each other.

In this embodiment, each of the sub-pixel units corresponds to one of the dielectric sub-layers. Specifically, a dielectric constant of a dielectric sub-layer corresponding to the red sub-pixel unit is ∈3; a dielectric constant of a dielectric sub-layer corresponding to the green sub-pixel unit is ∈4; and a dielectric constant of a dielectric sub-layer corresponding to the blue sub-pixel unit is ∈5.

In this embodiment, since the region A2 and region B2 of the dielectric sub-layer corresponding to the red sub-pixel unit have different electric fields, thus, the liquid crystal molecules at two sides of the pixel electrode 61 corresponding to the dielectric sub-layer corresponding to the red sub-pixel unit have two deflecting directions.

Since the region C2 and region D2 of the dielectric sub-layer corresponding to the green sub-pixel unit have different electric fields, thus, the liquid crystal molecules at two sides of the pixel electrode 61 corresponding to the dielectric sub-layer corresponding to the green sub-pixel unit have two deflecting directions.

Since the region E2 and the region F2 of the dielectric sub-layer corresponding to the blue sub-pixel unit have different electric fields, thus, the liquid crystal molecules at two sides of the pixel electrode 61 corresponding to the dielectric sub-layer corresponding to the blue sub-pixel unit have two deflecting directions.

In addition, intensities and directions of the electric fields in the region A2, the region C2 and the region E2 are different. Intensities and directions of the electric fields in the region B2, the region D2 and the region F2 are also different. As a result, the liquid crystal molecules have six deflecting directions and the pixel region corresponding to the liquid crystal display panel may define a six-domain structure.

It is appreciated by a person skilled in the art that, transmission rates (Tr) corresponding to the red sub-pixel unit, the green sub-pixel unit and the blue sub-pixel unit are different. In order to maximize the transmission rate of the liquid crystal display panel, there needs to maximize the transmission rates of the sub-pixel units with different colors. Therefore, dielectric constants of the dielectric layers corresponding to the sub-pixel units with three colors are different.

The dielectric constant ∈3 of the dielectric sub-layer corresponding to the red sub-pixel unit is set in such a manner that the dielectric sub-layer has a highest transmission rate for light with a wavelength of 620 nm to 760 nm. The dielectric constant ∈4 of the dielectric sub-layer corresponding to the green sub-pixel unit is set in such a manner that the dielectric sub-layer has a highest transmission rate for light with a wavelength of 495 nm to 570 nm. The dielectric constant ∈5 of the dielectric sub-layer corresponding to the blue sub-pixel unit is set in such a manner that the dielectric sub-layer has a highest transmission rate for light with a wavelength of 476 nm to 495 nm.

Alternatively, the dielectric constant of the dielectric sub-layer corresponding to the red sub-pixel unit is 2.5; the dielectric constant of the dielectric sub-layer corresponding to the green sub-pixel unit is 3.5; and the dielectric constant of the dielectric sub-layer corresponding to the blue sub-pixel unit is 4.5.

In this embodiment, the description is given with an example where the pixel unit includes red, green, and blue three sub-pixel units. In other embodiment of the present disclosure, the pixel unit may include sub-pixel units with other colors and the number of the sub-pixel units is not limited to three. For example, in other embodiment of the present disclosure, one pixel unit may further include cyan, yellow, and/or white sub-pixel units.

Third Embodiment

Figure 5:
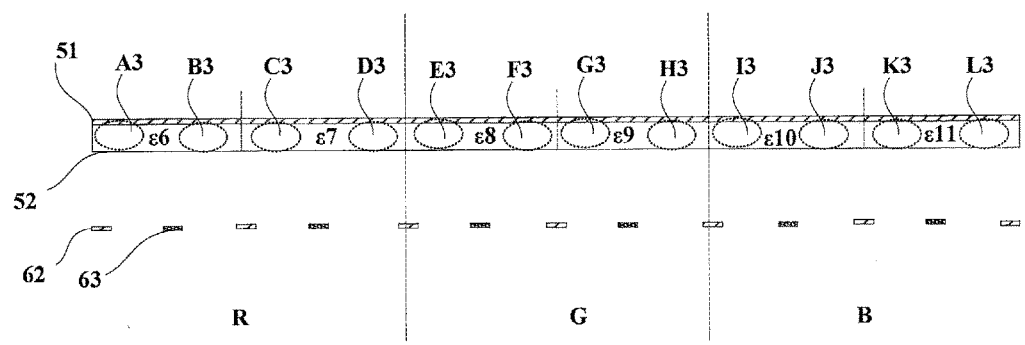
FIG. 5 is a schematic diagram showing a structure of a liquid crystal display panel according to a third embodiment of the present disclosure.

Referring to FIG. 5, FIG. 5 is a schematic diagram showing a structure of a liquid crystal display panel according to the third embodiment of the present disclosure.

In this embodiment, the liquid crystal display panel includes a first substrate and a second substrate disposed opposite to the first substrate. A liquid crystal layer (not shown) may be provided between the first substrate and the second substrate. The first substrate includes a first common electrode 51, a dielectric layer 52 and a plurality of pixel units (not shown). Each of the pixel units includes red (R), green (G), and blue (B) three sub-pixel units. In the figure, R, G, and B represent a region corresponding to a red sub-pixel unit, a region corresponding to a green sub-pixel unit and a region corresponding to a blue sub-pixel unit, respectively. The second substrate includes pixel electrodes and second common electrodes. The pixel electrode includes a plurality of sub-pixel electrodes.

The dielectric layer includes two dielectric sub-layers in a region corresponding to each pixel unit. Dielectric constants of the two dielectric sub-layers are different from each other.

Each of the sub-pixel units corresponds to one sub-pixel electrode. The sub-pixel electrodes and the second common electrodes are disposed in a same layer. The sub-pixel electrode includes a plurality of sub-pixel sub-electrodes 63 disposed in parallel. The second common electrode includes a plurality of common sub-electrodes 62 disposed in parallel. The sub-pixel sub-electrodes 63 and the common sub-electrodes 62 are arranged alternately.

Extension directions of the sub-pixel sub-electrodes 63 and extension directions of the common sub-electrodes 62 are the same. In each sub-pixel unit, a dividing line between two adjacent dielectric sub-layers is parallel to the extension direction of the sub-pixel sub-electrodes 63 and the common sub-electrodes 62.

A width of the sub-pixel sub-electrode 63 and the common sub-electrode 62 in a direction perpendicular to the extension directions is w. An interval between each sub-pixel sub-electrode 63 and its adjacent common sub-electrode 62 is s. A width of each dielectric sub-layer in a direction perpendicular to the extension directions is 2(w+s).

Specifically, dielectric constants of two dielectric sub-layers corresponding to the red sub-pixel unit are ∈6 and ∈7, respectively. Dielectric constants of two dielectric sub-layers corresponding to the green sub-pixel unit are ∈8 and ∈9, respectively. Dielectric constants of two dielectric sub-layers corresponding to the blue sub-pixel unit are ∈10 and ∈11, respectively.

Alternatively, the dielectric constant of the dielectric sub-layer corresponding to the red sub-pixel unit is set in such a manner that the dielectric sub-layer has a highest transmission rate for light with a wavelength of 620 nm to 760 nm. The dielectric constant of the dielectric sub-layer corresponding to the green sub-pixel unit is set in such a manner that the dielectric sub-layer has a highest transmission rate for light with a wavelength of 495 nm to 570 nm. The dielectric constant of the dielectric sub-layer corresponding to the blue sub-pixel unit is set in such a manner that the dielectric sub-layer has a highest transmission rate for light with a wavelength of 476 nm to 495 nm.

Alternatively, the dielectric constant of the dielectric sub-layer corresponding to the red sub-pixel unit is 2.5; the dielectric constant of the dielectric sub-layer corresponding to the green sub-pixel unit is 3.5; and the dielectric constant of the dielectric sub-layer corresponding to the blue sub-pixel unit is 4.5.

In this embodiment, since a region A3 and a region B3 in a first dielectric sub-layer corresponding to the red sub-pixel unit have different electric fields, thus, liquid crystal molecules at two sides of the sub-pixel sub-electrode 63 corresponding to the first dielectric sub-layer corresponding to the red sub-pixel unit have two deflecting directions.

Since a region C3 and a region D3 in a second dielectric sub-layer corresponding to the red sub-pixel unit have different electric fields, thus, liquid crystal molecules at two sides of the sub-pixel sub-electrode 63 corresponding to the second dielectric sub-layer corresponding to the red sub-pixel unit have two deflecting directions.

Since a region E3 and a region F3 in a first dielectric sub-layer corresponding to the green sub-pixel unit have different electric fields, thus, liquid crystal molecules at two sides of the sub-pixel sub-electrode 63 corresponding to the first dielectric sub-layer corresponding to the green sub-pixel unit have two deflecting directions.

Since a region G3 and a region H3 in a second dielectric sub-layer corresponding to the green sub-pixel unit have different electric fields, thus, liquid crystal molecules at two sides of the sub-pixel sub-electrode 63 corresponding to the second dielectric sub-layer corresponding to the green sub-pixel unit have two deflecting directions.

Since a region I3 and a region J3 in a first dielectric sub-layer corresponding to the blue sub-pixel unit have different electric fields, thus, liquid crystal molecules at two sides of the sub-pixel sub-electrode 63 corresponding to the first dielectric sub-layer corresponding to the blue sub-pixel unit have two deflecting directions.

Since a region K3 and a region L3 in a second dielectric sub-layer corresponding to the blue sub-pixel unit have different electric fields, thus, liquid crystal molecules at two sides of the sub-pixel sub-electrode 63 corresponding to the second dielectric sub-layer corresponding to the blue sub-pixel unit have two deflecting directions.

In addition, intensities and directions of the electric fields in the region A3, the region C3, the region E3, the region G3, the region I3 and the region K3 are different. Intensities and directions of the electric fields in the region B3, the region D3, the region F3, the region H3, the region J3 and the region L3 are also different. As a result, the liquid crystal molecules have twelve deflecting directions and the pixel region corresponding to the liquid crystal display panel may define a twelve-domain structure.

In the above embodiment, the first substrate may be a color filter substrate, and the second substrate may be an array substrate.

One embodiment of the present disclosure further provides a liquid crystal display device, including the liquid crystal display panel in any of the above embodiments.

The above is only optional embodiments of the present disclosure, it should be noted that several improvements and modifications may be made for a person skilled in the art without departing from the principle of the present disclosure, and also should be considered to fall within the protection scope of the present disclosure.

What is claimed is:
1. A liquid crystal display panel, comprising a first substrate and a second substrate disposed opposite to the first substrate; wherein the first substrate comprises a first com- mon electrode and a dielectric layer, and the second substrate comprises a second common electrode and a pixel electrode;

wherein the dielectric layer comprises at least two dielectric sub-layers in a region corresponding to each pixel unit; and dielectric constants of the at least two dielectric sub-layers are different from each other; and each of the pixel units comprises three sub-pixel units which are red, green, and blue; and the dielectric constant of at least one of the dielectric sub-layers in a red sub-pixel unit is set in such a manner that the at least one of the dielectric sub-layers in the red sub-pixel unit has a highest transmission rate for light with a wavelength of 620 nm to 760 nm; the dielectric constant of at least one of the dielectric sub-layers in a green sub-pixel unit is set in such a manner that the at least one of the at least one of the dielectric sub-layers in the green sub-pixel unit has a highest transmission rate for light with a wavelength of 495 nm to 570 nm; the dielectric constant of at least one of the dielectric sub-layers in a blue sub-pixel unit is set in such a manner that the at least one of the dielectric sub-layers in the blue sub-pixel unit has a highest transmission rate for light with a wavelength of 476 nm to 495 nm; and the dielectric constant of the at least one of the dielectric sub-layers in the red sub-pixel unit is 2.5; the dielectric constant of the at least one of the dielectric sub-layers in the green sub-pixel unit is 3.5; and the dielectric constant of the at least one of the at least one of the dielectric sub-layers in the blue sub-pixel unit is 4.5.

2. The liquid crystal display panel according to claim 1, wherein the dielectric layer comprises at least two dielectric sub-layers in the region corresponding to each sub-pixel unit.

3. The liquid crystal display panel according to claim 2, wherein each sub-pixel unit corresponds to one sub-pixel electrode; the sub-pixel electrodes and the second common electrode are disposed in a same layer; the sub-pixel electrode comprises a plurality of sub-pixel sub-electrodes disposed in parallel; the second common electrode comprises a plurality of common sub-electrodes disposed in parallel; the sub-pixel sub-electrodes and the common sub-electrodes are arranged alternately;

extension directions of the sub-pixel sub-electrodes and extension directions of the common sub-electrodes are the same; in each sub-pixel unit, a dividing line between two adjacent dielectric sub-layers is parallel to the extension directions of the sub-pixel sub-electrodes and the common sub-electrodes; and a width of each of the sub-pixel sub-electrodes and the common sub-electrodes in a direction perpendicular to the extension directions is w; an interval between each sub-pixel sub-electrode and an adjacent common sub-electrode is s; and a width of each dielectric sub-layer in the direction perpendicular to the extension directions is 2(w+s).

4. The liquid crystal display panel according to claim 1, wherein the pixel electrode and the second common electrode are disposed in a same layer; the pixel electrode comprises a plurality of pixel sub-electrodes disposed in parallel; the second common electrode comprises a plurality of common sub-electrodes disposed in parallel; and the pixel sub-electrodes and the common sub-electrodes are arranged alternately.

5. The liquid crystal display panel according to claim 4, wherein the pixel electrode and the second common electrode are comb-shaped electrodes.

6. The liquid crystal display panel according to claim 4, wherein extension directions of the pixel sub-electrodes and extension directions of the common sub-electrodes are the same; and a dividing line between every two adjacent dielectric sub-layers is parallel to the extension directions of the pixel sub-electrodes and the common sub-electrodes.

7. The liquid crystal display panel according to claim 6, wherein a width of each of the pixel sub-electrodes and the common sub-electrodes in a direction perpendicular to the extension directions is w; an interval between each pixel sub-electrode and an adjacent common sub-electrode is s; and a width of each dielectric sub-layer in the direction perpendicular to the extension directions is 2(w+s).

8. The liquid crystal display panel according to claim 1, wherein each pixel unit comprises sub-pixel units with more than four colors.

9. A liquid crystal display device, comprising a liquid crystal display panel;

wherein the liquid crystal display panel comprises a first substrate and a second substrate disposed opposite to the first substrate, the first substrate comprises a first common electrode and a dielectric layer, and the second substrate comprises a second common electrode and a pixel electrode;

the dielectric layer comprises at least two dielectric sub-layers in a region corresponding to each pixel unit; and dielectric constants of the at least two dielectric sub-layers are different from each other;

each of the pixel units comprises three sub-pixel units which are red, green, and blue;

the dielectric constant of at least one of the dielectric sub-layers in a red sub-pixel unit is set in such a manner that the at least one of the dielectric sub-layers in the red sub-pixel unit has a highest transmission rate for light with a wavelength of 620 nm to 760 nm; the dielectric constant of at least one of the dielectric sub-layers in a green sub-pixel unit is set in such a manner that the at least one of the dielectric sub-layers in the green sub-pixel unit has a highest transmission rate for light with a wavelength of 495 nm to 570 nm; the dielectric constant of at least one of the dielectric sub-layers in a blue sub-pixel unit is set in such a manner that the at least one of the at least one of the dielectric sub-layers in the blue sub-pixel unit has a highest transmission rate for light with a wavelength of 476 nm to 495 nm; and the dielectric constant of the at least one of the dielectric sub-layers in the red sub-pixel unit is 2.5; the dielectric constant of the at least one of the dielectric sub-layers in the green sub-pixel unit is 3.5; and the dielectric constant of the at least one of the dielectric sub-layers in the blue sub-pixel unit is 4.5.

10. The liquid crystal display device according to claim 9, wherein the dielectric layer comprises at least two dielectric sub-layers in the region corresponding to each sub-pixel unit.

11. The liquid crystal display device according to claim 10, wherein each sub-pixel unit corresponds to one sub-pixel electrode; the sub-pixel electrodes and the second common electrode are disposed in a same layer; the sub-pixel electrode comprises a plurality of sub-pixel sub-electrodes disposed in parallel; the second common electrode comprises a plurality of common sub-electrodes disposed in parallel; the sub-pixel sub-electrodes and the common sub-electrodes are arranged alternately;

extension directions of the sub-pixel sub-electrodes and extension directions of the common sub-electrodes are the same; in each sub-pixel unit, a dividing line between two adjacent dielectric sub-layers is parallel to the extension directions of the sub-pixel sub-electrodes and the common sub-electrodes; and a width of each of the sub-pixel sub-electrodes and the common sub-electrodes in a direction perpendicular to the extension directions is w; an interval between each sub-pixel sub-electrode and an adjacent common sub-electrode is s; and a width of each dielectric sub-layer in the direction perpendicular to the extension directions is 2(w+s).

12. The liquid crystal display device according to claim 9, wherein the pixel electrode and the second common electrode are disposed in a same layer; the pixel electrode comprises a plurality of pixel sub-electrodes disposed in parallel; the second common electrode comprises a plurality of common sub-electrodes disposed in parallel; and the pixel sub-electrodes and the common sub-electrodes are arranged alternately.

13. The liquid crystal display device according to claim 12, wherein the pixel electrode and the second common electrode are comb-shaped electrodes.

14. The liquid crystal display device according to claim 12, wherein extension directions of the pixel sub-electrodes and extension directions of the common sub-electrodes are the same; and a dividing line between every two adjacent dielectric sub-layers is parallel to the extension directions of the pixel sub-electrodes and the common sub-electrodes.

15. The liquid crystal display device according to claim 14, wherein a width of each of the pixel sub-electrodes and the common sub-electrodes in a direction perpendicular to the extension direction is w; an interval between each pixel sub-electrode and an adjacent common sub-electrode is s; and a width of each dielectric sub-layer in the direction perpendicular to the extension directions is 2(w+s).

16. The liquid crystal display panel according to claim 9, wherein each of the pixel units comprises sub-pixel units with more than four colors.

* * * * *